US009163514B2

(12) United States Patent
Dimmick, III

(10) Patent No.: US 9,163,514 B2
(45) Date of Patent: Oct. 20, 2015

(54) SYSTEM AND METHOD FOR COUPLING ROTOR COMPONENTS

(75) Inventor: John Herbert Dimmick, III, Greenville, SC (US)

(73) Assignee: General Electric Company, Schenectady, NY (US)

(*) Notice: Subject to any disclaimer, the term of this patent is extended or adjusted under 35 U.S.C. 154(b) by 701 days.

(21) Appl. No.: 13/436,814

(22) Filed: Mar. 30, 2012

(65) Prior Publication Data
US 2013/0259678 A1  Oct. 3, 2013

(51) Int. Cl.
F03B 1/00 (2006.01)
F01D 5/06 (2006.01)
H02K 7/00 (2006.01)

(52) U.S. Cl.
CPC .............. F01D 5/066 (2013.01); H02K 7/003 (2013.01); F05D 2230/64 (2013.01); Y10T 29/49321 (2015.01)

(58) Field of Classification Search
CPC ............ F10D 5/06; F10D 5/066; H02K 7/003
USPC ............... 416/198 R, 244 R, 198 A; 29/889.2
See application file for complete search history.

(56) References Cited

U.S. PATENT DOCUMENTS 4,045,099 A * 8/1977 Andersson et al. ............ 384/129
4,086,690 A * 5/1978 Bernasconi ................. 29/889.2
4,453,889 A * 6/1984 Sakata et al. ............. 416/198 A
5,031,400 A * 7/1991 Boyd ............................... 60/799
6,438,837 B1 * 8/2002 Berry et al. ..................... 29/889
6,996,914 B1 * 2/2006 Istre et al. ........................ 33/645

FOREIGN PATENT DOCUMENTS

EP 1435431 A1 7/2004
FR 2329882 A1 5/1977
(Continued)

OTHER PUBLICATIONS

Azom, Silicon Nitride Properties and Applications, http://www.azom.com/properties.aspx?ArticleID=53.*
(Continued)

Primary Examiner — Dwayne J White
Assistant Examiner — Jason Fountain
(74) Attorney, Agent, or Firm — Fletcher Yoder P.C.

(57) ABSTRACT

A system includes a rotor assembly with a first rotor component having a first set of bushing receptacles and a first set of bolt holes arranged about a first rotational axis of the first rotor component. The rotor assembly also includes a second rotor component having a second set of bushing receptacles and a second set of bolt holes arranged about a second rotational axis of the second rotor component. The rotor assembly includes a first set of bushings disposed in the first and second sets of bushing receptacles in a first installed configuration, wherein the first installed configuration of the first set of bushings is configured to align the first and second rotational axes with one another, and the first installed configuration of the first set of bushings is configured to bear at least a first portion of a torque during rotation of the rotor assembly. The rotor assembly also includes a first set of bolts extending through the first and second sets of bolt holes to retain the first rotor, the second rotor, and the first set of bushings in the rotor assembly.

19 Claims, 4 Drawing Sheets

(56) References Cited

FOREIGN PATENT DOCUMENTS

GB    599809    *    1/1945
GB    599809  A      3/1948

OTHER PUBLICATIONS

European Search Report and Written Opinion issued in connection with corresponding EP Application No. 13160884.6-1610 on Jul. 14, 2014.

* cited by examiner

SYSTEM AND METHOD FOR COUPLING ROTOR COMPONENTS

BACKGROUND OF THE INVENTION

The subject matter disclosed herein relates to couplings for rotating components, more specifically, to couplings for turbomachinery.

Mechanical energy may be transferred in many ways, including by way of rotating parts, such as a shaft or rotor. Rotating parts transfer torque through contact forces with other parts. For friction drive arrangements, torque transmission may be limited by the surface friction between the two parts and the compression force between the parts. Bolts may be used to compress the parts for rotating parts. However, for rotor structures carrying the mass of bolts, utilizing large bolts to create sufficient compression force can be a challenge.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a rotor assembly with a first rotor component having a first set of bushing receptacles and a first set of bolt holes arranged about a first rotational axis of the first rotor component. The rotor assembly also includes a second rotor component having a second set of bushing receptacles and a second set of bolt holes arranged about a second rotational axis of the second rotor component. The rotor assembly includes a first set of bushings disposed in the first and second sets of bushing receptacles in a first installed configuration, wherein the first installed configuration of the first set of bushings is configured to align the first and second rotational axes with one another, and the first installed configuration of the first set of bushings is configured to bear at least a first portion of a torque during rotation of the rotor assembly. The rotor assembly also includes a first set of bolts extending through the first and second sets of bolt holes to retain the first rotor, the second rotor, and the first set of bushings in the rotor assembly.

In a second embodiment, a system includes a turbomachine with a stator and a rotor assembly. The rotor assembly includes a first rotor component with a first set of bushing receptacles arranged about a first rotational axis of the first rotor component and a second rotor component having a second set of bushing receptacles arranged about a second rotational axis of the second rotor component. The rotor assembly also includes a first set of bushings disposed in the first and second sets of bushing receptacles in a first installed configuration, wherein the first installed configuration of the first set of bushings is configured to align the first and second rotational axes with one another.

In a third embodiment, a method includes aligning a first rotational axis of a first rotor component with a second rotational axis of a second rotor component by way of a first set of bushings disposed in first opposing bushing receptacles in the first and second rotor components. The first set of bushings and the first opposing bushing receptacles are arranged about the first and second rotational axes. The method also includes bearing, in the first set of bushings, at least a first portion of a torque during rotation of a rotor assembly having the first and second rotor components.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
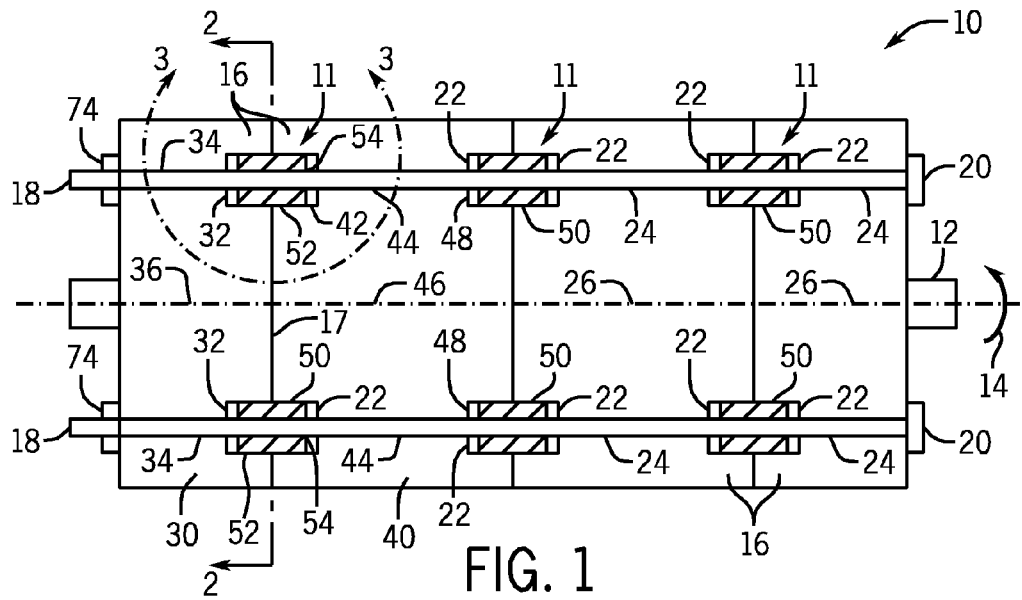
FIG. 1 is a cross-sectional side view of an embodiment of a rotor assembly with a plurality of rotor components having bolts and bushings.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A system and method for coupling rotor components as described herein has a rotor assembly with at least two rotor components (e.g., 2 to 100 rotor components). Each rotor component has a set of bushing receptacles and a set of bolt holes arranged about a rotational axis of the rotor component. For example, each pair of adjacent rotor components may include axially facing sides, which include bushings disposed in opposite bushing receptacles and bolts extending through opposite bolt holes. A set of bushings disposed in the set of bushing receptacles of each rotor component aligns the rotational axes of each component and bears at least a first portion of torque during rotation of the coupled rotor components. A set of bolts extend through the sets of bolt holes to retain the rotors and set of bushings in the rotor assembly. The set of bushings may have a total shear strength greater than the total shear strength of the set of bolts. The set of bushings may have a total shear strength great enough to resist normal operating loads and minor over-torques. The set of bushings may bear a substantially greater amount of torque than the bolts (e.g., 10 to 100% of total torque). The bushings may have a total shear strength greater than 1400 MPa, although the shear strength may vary from one application to another. Each bushing may be solid without any bolt hole, or may include a hole (e.g., bolt hole) to pass a bolt for axially securing the rotor components or to improve compliance between rotor components. The set of bushings may be close fit or interference fit into the respective sets of bushing receptacles to align the rotational axes in an installed configuration. Although the disclosed embodiments may employ the bushings in a single pair of adjacent rotor components, the disclosed bushing may be disposed between any number of adjacent rotor components (e.g., 2, 3, 4, 5, 6, 7, 8, 9, 10, or more), wherein a set of bushings is disposed in opposite bushing receptacles in axially facing sides of each pair of adjacent rotor components. In some embodiments, the rotor assembly may be a part of a turbine, a compressor, a generator, a gas turbine engine, or other turbomachinery. Each bushing receptacle may include an undercut fillet.

Additionally, a method may include aligning a first rotational axis of a first rotor component with a second rotational axis of a second rotor component by way of a first set of bushings disposed in opposing bushing receptacles of the first and second rotor components arranged about the first and second rotational axes. The method may also include bearing a portion of a torque in the first set of bushings during rotation of the rotor assembly. The method may include aligning a third rotational axis of a third rotor component with the second rotational axis by way of a second set of bushings disposed in other opposing bushing receptacles arranged about the second and third rotational axes and bearing a second portion of the torque in the second set of bushings during rotation of the rotor assembly. Also, the method may include retaining the rotor assembly with a set of bolts extending through bolt holes in the first, second, and third rotor components.

Turning now to the drawings, FIG. 1 illustrates an embodiment of a rotor assembly 10 coupled together by a torque transfer bushing assembly 11. As a shaft 12 rotates in a circumferential direction 14, a plurality of rotor components 16 of the rotor assembly 10 also rotate in the circumferential direction 14, while the bushing assembly 11 bears a substantial portion or all of the torque between adjacent rotor components 16. The shaft 12 may be coupled to at least one rotor component 16, and the shaft 12 may extend through one or more rotor components 16 as illustrated in FIG. 1. In some embodiments, the shaft 12 transmits torque to the one or more rotor components 16 coupled to the shaft 12, and torque is transferred between adjacent rotor components 16 and/or the shaft 12. Rotor components 16 may include turbine blades, compressor blades, armatures, gears, pulleys, propellers, or centrifugal pumps, or combinations thereof. Thus, the rotor assembly 10 may represent all or part of a turbine, a compressor, a pump, a motor, a generator, or any rotary turbomachine.

Four rotor components 16 are illustrated in FIG. 1, although more or less are envisioned (e.g., between 2 to 25, 3 to 20, 4 to 15, or 5 to 10 rotor components). Each rotor component 16 may include at least one set of bushing receptacles 22, at least one set of bolt holes 24, and a rotational axis 26. The first rotor component 16, and the second rotor component 16, 40 may represent any pair of adjacent rotor components 16 in various embodiments and are shown for clarity. The first rotor component 30 has a first set 32 of bushing receptacles 22, a first set 34 of bolt holes 24, and a first rotational axis 36. The second rotor component 40 has a second set 42 of bushing receptacles 22, a second set 44 of bolt holes 24, and a second rotational axis 46. In certain embodiments, some rotor components 16 may include more than one set of bushing receptacles 22. For example, the second rotor component 40 may have a third set 48 of bushing receptacles 22 as illustrated in FIG. 1. Each set of bushing receptacles 22 of a rotor component 16 may correspond to and be opposed to another set of bushing receptacles 22 of another adjacent rotor component 16. For example, the first set 32 of bushing receptacles 22 axially faces and aligns with the second set 42 of bushing receptacles 22. In an installed configuration, a set of bushings 50 may be disposed in the opposing sets of bushing receptacles 22 to align the rotational axes 26 of the rotor components 16, and bear at least a portion of a torque between the rotor components 16 as the shaft 12 and rotor assembly 10 rotate. In an embodiment, the set of bushings 50 may interference fit in the bushing receptacles 22 in the installed configuration to couple and align the rotor components 16. For example, a first set of bushings 52 may be disposed in the opposing first 32 and second 42 sets of bushing receptacles 22 to align the first 26 and second 36 rotational axes with one another as described below. In the illustrated embodiment, three sets of bushings 50 are disposed in three sets of opposing bushing receptacles 22 in adjacent rotor components 16.

Bolts 18 (e.g., 1 to 100 or more) may extend through the bolt holes 24 to axially compress, retain, and support the rotor components 16 and bushings 50. Each bolt 18 may axially compress the rotor components 16 and bushings 50 between a bolt head 20 and a fastener 74 (e.g., nut). In some embodiments, the bolts 18 support the shaft 12 to reduce deflection of the rotor assembly 10 due gravity and/or loads on the rotor assembly 10. In an embodiment, the bushings 50 may have a third set 54 of bolt holes, through which at least some of the set of bolts 18 may pass through in addition to the first 34 and second 44 sets of bolt holes 24. In another embodiment, each bushing 50 may have a solid body without any bolt hole 54.

Figure 2:
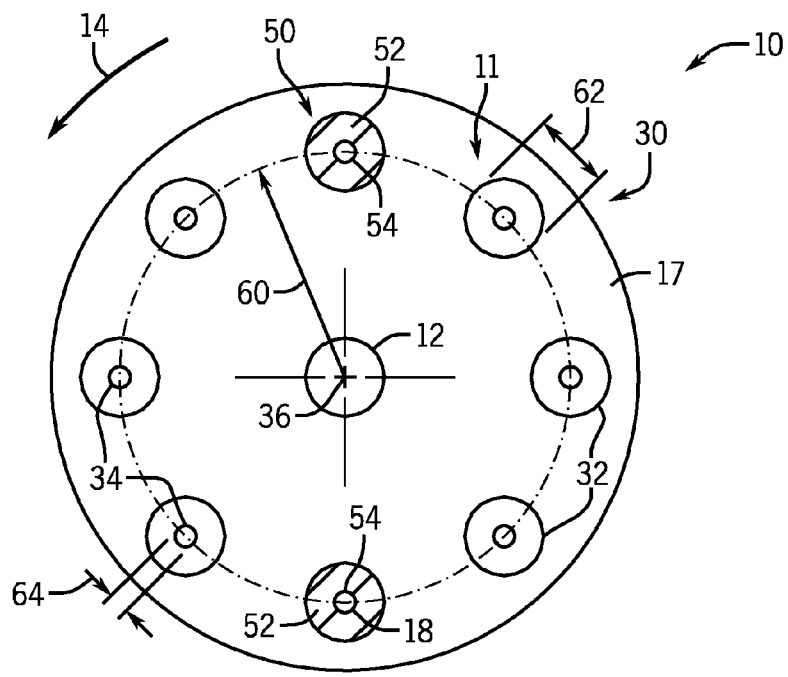
FIG. 2 is a cross-sectional view of an embodiment of a rotor component of FIG. 1 taken within line 2-2.

FIG. 2 is a cross-sectional view of an embodiment of the rotor assembly 10 of FIG. 1, taken along line 2-2, illustrating the torque transfer bushing assembly 11 along a frictional interface between the first rotor component 30 and the second rotor component 40. FIG. 2 shows each the set of bushing receptacles 22, 32 arranged at a radial distance 60 about the rotational axis 26, 36. Although the following discussion of the bushing assembly 11 refers to the rotor component 30, the same also applies to each rotor component 16 of the rotor assembly 10. In an embodiment, each bushing receptacle 32 is centered at the same radial distance 60 from the rotational axis 36. Alternatively, the bushing receptacles 32 may be arranged at varying radial distances 60 from the rotational axis. The bushing receptacles 32 may be disposed at radial distances 60 within certain run-out tolerances used to align the first rotor component 30 relative to the shaft 12, axis 26, and/or other rotor components 16. The bushing receptacles 32 may be any shape, including but not limited to, circular (e.g., counterbore, countersink), arcuate, triangular, or rectangular shapes. Certain embodiments with counterbore bushing receptacles 32 may have a diameter 62 within a receptacle tolerance range. The diameter 62 of the bushing receptacles 32 may range from approximately 20 to 110 millimeters, 30 to 80 millimeters, 40 to 65 millimeters, or 45 to 55 millimeters. In some embodiments, the bushing receptacle diameter 62 may range from approximately 1 to 20 percent, 2 to 15 percent, 3 to 10 percent, or 5 to 8 percent of the rotor component diameter 66. The corresponding bushings 50, 52 may be substantially the same size and shape as the respective bushing receptacles 22, 32. In some embodiments, the bushings 52 may be slightly larger than the corresponding bushing receptacles 32, resulting in an interference fit when disposed in the installed configuration. The bushings 52 may also be made within bushing tolerances to properly fit into the bushing receptacles 32 and align rotor components 16 as discussed below. FIG. 2 shows two bushings 52 in an installed configuration in the first rotor component 30 in the top and bottom bushing receptacles 32. In an embodiment, bushings 52 may be disposed in all of the bushing receptacles 32 in an installed configuration to align the first rotor component 30 with the opposing rotor component 40 and transfer torque between the first rotor component 30 and the second rotor component 40. The number of bushing receptacles 32 in a set arranged about the rotational axis 36 may be between approximately 2 to 50, 5 to 30, 7 to 25, or 10 to 20. In some embodiments, the bushing receptacles 32 may be uniformly shaped, sized, and arranged around the rotational axis 36 of the first rotor component 30 to provide for stable rotation in the circumferential direction 14.

In an embodiment, the set of bolt holes 34 are also arranged at the same radial distance 60 from the rotational axis 36 of the first rotor component 30 as the set of bushing receptacles 32. The bolt holes 34 may be any shape including, but not limited to, circular, arcuate, triangular, or rectangular shapes with a defined width or diameter 64. In some embodiments, the bolt hole diameter 64 may range from approximately 5 to 90 millimeters, 10 to 80 millimeters, 25 to 60 millimeters, or 30 to 45 millimeters. In some embodiments, the bolt hole diameter 64 may be sized relative to the bushing diameter 62. For example, the bolt hole diameter 64 may range from approximately 1 to 75 percent, 5 to 50 percent, 10 to 25 percent, or 10 to 15 percent of the bushing diameter 62. In the embodiment of FIG. 2, the set of bolt holes 34 may be concentric with the bushing receptacles 32. Alternatively, the bolt holes 34 may not be concentric with the bushing receptacles 32. Additionally, the bolt holes 34 may be disposed through the first rotor component 30 outside of the bushing receptacles 32 at the same or different radial distance 60 from the rotational axis 36 as the bushing receptacles 32. The number of bolt holes 34 in a set arranged about the rotational axis 36 may also be between approximately 2 to 50, 5 to 30, 7 to 25, or 10 to 20. However, the number of bolt holes 34 may be the same or different from the number of bushing receptacles 32. For example, bolt holes 34 may be disposed in approximately 25, 33, 50, 75 or 100 percent of the bushing receptacles 32. In some embodiments, the bolt holes 34 may be uniformly shaped and arranged around the rotational axis 36 of the first rotor component 30 to provide for stable rotation in the circumferential direction 14. In other words, uniformities in the size and/or arrangement of bushing receptacles 32, bushings 52, and/or bolt holes 34 may help to balance the rotor assembly 10.

Figure 3:
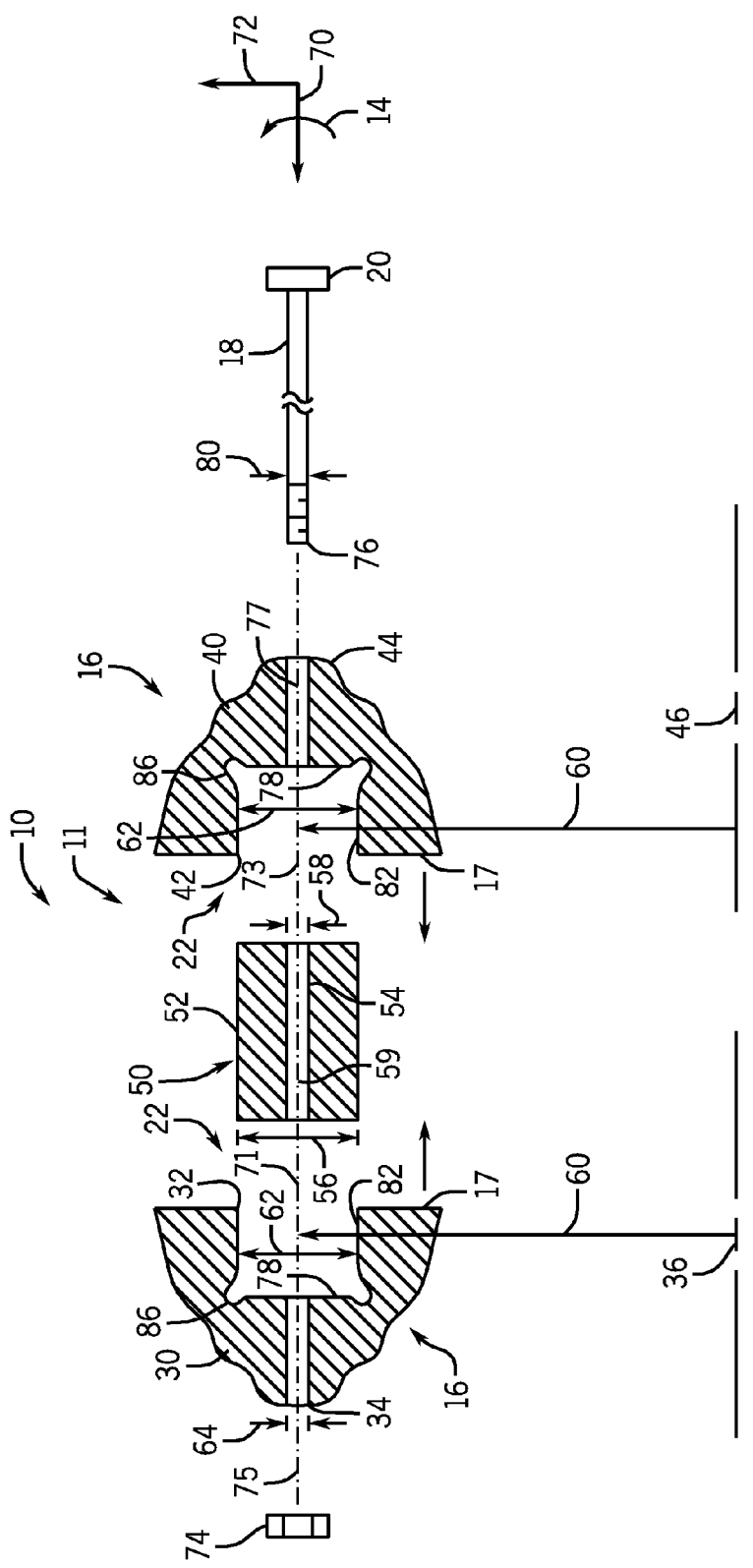
FIG. 3 is an exploded cross-sectional view of an embodiment of a bolt, bushing, and bushing receptacles of FIG. 1 taken within line 3-3.

FIG. 3 illustrates a portion of the rotor assembly 10 of FIG. 1 taken within line 3-3, illustrating an embodiment of the torque transfer bushing assembly 11. FIG. 3 shows an exploded cross-sectional view of rotor assembly 10 including the bolt 18, the bushing 50, 52 with the bolt hole 54, the first rotor component 16, 30 with the first bushing receptacle 22, 32 and first bolt hole 34, and the second rotor component 16, 40 with the second bushing receptacle 22, 42. In the illustrated embodiment, the bushing 52 may have bushing diameter 56, while the bushing 52 may have a bolt hole 54 with a diameter 58 that extends through the bushing 52 in the axial direction 70. The bolt hole 54 may be approximately concentric with the bushing 52 as illustrated, or the bolt hole 54 may be off center.

In an installed configuration, the bushing 52 may be inserted into the first bushing receptacle 32 and the second bushing receptacle 42. The bolt 18 may be inserted through the first bolt hole 34 and the second bolt hole 44 and fastened to axially compress and retain the first rotor component 30, the second rotor component 40, and the bushing 52. In certain embodiments, the bolt 18 may also be inserted through the third bolt hole 54 through the bushing 52. In the installed configuration, the bolt 18 may axially compress the rotor assembly 10 in the axial direction 70 via a nut 74 or other fastener at the distal end 76 of the bolt 18 and the bolt head 20. In an embodiment, torque may be transferred between the first rotor component 30 and the second rotor component 40 by contact forces between the bushing 52 and receptacle faces 78 and/or between the frictional interface 17 of the rotor components 30, 40. In this embodiment, increased compression from the bolt 18 may increase the torque transmitted by contact forces between rotor components 30, 40 and decrease the torque carried by the bushing 52. In some embodiments, the bolt hole diameter 64 and/or 58 may be substantially greater than the bolt diameter 80. In other embodiments, the bolt 18 may have a close tolerance fit in the first bolt hole 34, the second bolt hole 44, and/or the bushing bolt hole 54. In some embodiments, the bolt 18 may also transmit a portion of the torque between the first rotor component 30 and the second rotor component 40 in the event of over-torques exceeding the flange frictional forces and the bushing elastic strength.

In some embodiments, the bushing diameter 56 is slightly greater than the bushing receptacle diameter 62, thus the bushing 52 may be interference fit in the first bushing receptacle 32 and/or the second bushing receptacle 42. For example, the bushing diameter 56 may be approximately 0.5, 1, 2, 3, 4, 5, 10 percent or more greater than the bushing receptacle diameter 52. However, the bushing 52 may transmit torque between the first 30 and second 40 rotor components without an interference fit between the bushing 52 and bushing receptacles 32, 42. In an interference fit, the bushing 52 may be deformed and/or the first 32 and second 42 bushing receptacles 22 may expand to accommodate the interference fit. In an interference fit, the receptacle walls 82 and bushing 52 may respectively constrain motion in the circumferential direction 14 and/or the radial direction 72. Through the interference fit, the bushing 52 may better transmit torque between the first rotor component 30 and the second rotor component 40 through at least the receptacle walls 82 than without the interference fit. The interference fit may also better align the first rotor component 30 with the second rotor component 40 as discussed below. In some embodiments, the bushing receptacles 32, 42 may have undercut fillets 86 to reduce localized stresses within the receptacles due to the interference fit of the bushing 52, torque transmission by the bushing 52, vibrations, or other forces, or combinations thereof. In an embodiment, the undercut fillets 86 may be shot peened. A shot peened undercut fillet may help prevent high cycle fatigue of the first 32 and second 42 bushing receptacles 22.

Concentric alignment of the first rotational axis 36 with the second rotational axis 46 may improve the torque transmission efficiency of the rotor assembly 10 and/or reduce wear on the shaft 12, first rotor component 30, second rotor component 40, bolts 18, or bushings 52, or combinations thereof. Concentrically aligned rotor components 30, 40 and aligned rotational axes 36, 46 may help prevent instabilities, vibrations, and/or fatigue in the rotor assembly 10. Furthermore, a concentric and aligned rotor assembly 10 may decrease down time due to maintenance and repairs because of reduced wear on the rotor components 16, bolts, 18, and bushings 52. In some embodiments, first 32 or second 42 bushing receptacles may be repaired or modified by counterboring larger bushing receptacle diameters 62 into the frictional interface 17 and utilizing bushings 52 with larger diameters 56. Concentric alignment of the rotor components 30, 40 may depend at least in part on the run-out tolerance of the radial distance 60 of the bushing receptacles 32, 42 from the respective rotational axes 36, 46. A master tool having pins in a complementary pattern to the bushing receptacles 22 of a rotor component 16 may be used to determine the run-out of the rotor component 16. The master tool may permit sorting of rotor components 16 within the run-out tolerance of the master tool to select rotor components 16 having bushing receptacles 22 at compatible radial distances 60. For example, a master tool may be used to determine rotor components 16 with bushing receptacles 22 within the run-out tolerance 60 that may be stacked such that the total run-out of the rotor assembly 10 is minimized.

The bushing 52 may constrain the motion of the first rotor component 30 and the second rotor components 40 in the circumferential direction 14 and/or the radial direction 72 through contact between the bushing 52 and the receptacle walls 82. In this manner, the bushing 52 may also locate the first rotor component 30 in an aligned position relative to the second rotor component 40, such that the first rotational axis 36 and the second rotational axis 46 are approximately coaxial. For example, the first bushing receptacle 32 has a first receptacle axis 71, the bushing 52 has an axis 59, and the second bushing receptacle 42 has a second receptacle axis 73. The first 71 and second 73 receptacle axes may be at a radial distance 60 (within run-out tolerances) of the first 36 and second 46 rotational axes. The bushing 52 may have a larger diameter 56 than the bushing receptacle diameters 62, and thus be interference fit into the first 32 and second 42 bushing receptacles in the installed configuration. The interference fit may block relative movement between the first rotor component 30 and second rotor component 40, securing the rotor assembly 10 in the installed configuration. The bushing 52 may be configured to align the first 71 and second 73 receptacle axes with the bushing axis 59, and thus align the first 36 and second 46 rotational axes to be approximately coaxial. In a similar manner, as seen in FIG. 1, a second set of bushings 50 may concentrically align the rotational axis of a third rotor component 16 with the first rotor component 30 and second rotor component 40 by inserting the second set of bushings 50 in bushing receptacles 48 on the second rotor component 40 and opposing bushing receptacles 22 on the third rotor component 16.

In an embodiment, a first bolt hole axis 75 and a second bolt hole axis 77 may be approximately coaxial with the first receptacle axis 71 and second receptacle axis 73 respectively. In this embodiment, the bolt holes 34, 44 may be approximately coaxial in the installed configuration. In another embodiment, first bolt hole 34, second bolt hole 44, and bushing bolt hole 54 may not share a common axis, however the first rotational axis 36 and the second rotational axis 46 are approximately coaxial in the installed configuration. For example, a bolt 18 may extend through the first 30 and second 40 rotor components without passing through a bushing 52. In an embodiment without coaxial first 34 and second 44 bolt holes, the bolt 18 may have a smaller diameter 80 than the first 34 and second 44 bolt holes and be configured to have clearance to pass through the rotor assembly 10 to retain and axially compress the rotor assembly 10. In this embodiment, only the bolt head 20 and fastener 74 may contact the first rotor component 30 and second rotor component 40. Such smaller diameter bolts 18 with clearance through the first 34 and second 44 bolt holes may not bear a portion of the torque between the first rotor component 30 and the second rotor component 40.

In an embodiment, the receptacle tolerance 62, bushing tolerance 56, and run-out tolerance 60 may be tighter than tolerances for the bolts 18 and first 34 and second 44 bolt holes, so that the bushings 52 disposed in the first 32 and second 42 bushing receptacles 22 may primarily align the first rotational axis 36 with the second rotational axis 46. In this embodiment, the bushings 52 may transmit a substantially greater amount (or all) of the torque between the first rotor component 30 and second rotor component 40 than the bolts 18. In an embodiment, the percentage of torque transmitted by the bushings 52 between the first 30 and second 40 rotor components may be between approximately 1 to 100 percent, 25 to 100 percent, 40 to 90 percent, or 50 to 75 percent, with the remaining percentage of torque, if any, being transmitted by the frictional interface 17 of the first 30 and second 40 rotor components and/or the bolts 18. The bushings 52 and frictional interface 17 may transmit all the torque between the first 30 and second 40 rotor components during normal operation and minor over-torque operation. The bolts 18 may bear torque during major over-torque operation such as a fault torque event. For example, the bushings 52 may transmit approximately 90 percent of the torque, the frictional interface 17 may transmit approximately 5 percent of the torque, and the bolts 18 may transmit approximately 5 percent of the torque. As another example, the bushings 52 may transmit approximately 75 percent of the torque, the frictional interface 17 may transmit approximately 20 percent of the torque, and the bolts 18 may transmit approximately 5 percent of the torque. As discussed above, in some embodiments, the bushings 52 and first 32 and second 42 bushing receptacles 22 may align the rotor assembly 10, such that the bolts 18 may primarily axially compress the rotor assembly 10. In an embodiment, the first rotor component 30 is coaxially aligned with a matching and opposing second rotor component 40 through the bushings 52 and opposing bushing receptacles 32, 42 in series and assembled as the rotor assembly 10 with a stack up tolerance for the alignment based primarily on the run-out tolerance of the bushing receptacles 32, 42, the bushing receptacle tolerance 62, and the bushing tolerance 56.

A bolt 18 of a ductile metal sized to bear torsion and tension loads may be larger than a bolt 18 of the same metal sized to bear primarily a tension load. Bolts 18 may be made of many materials including but not limited to steel (e.g., stainless steel or tool steel) or superalloys (e.g., inconel). In an embodiment in which the bushing 52 may bear a portion of the torque transferred between the first rotor component 30 and the second rotor component 40, the bushing 52 may be made of a high strength, low wear material such as a cobalt alloy (e.g., MP35N or MP159). Utilizing bushings 52 to bear at least a first portion of the torque between the first rotor component 30 and the second rotor component 40 may provide for a rotor assembly 10 with smaller bolts 18. Additionally, bushings 52 may be sized to bear a fault torque event (e.g., surge in torque), so that the bolts 18 may be capable of bearing the remaining torque. A rotor assembly 10 with bushings 52 bearing at least a first portion of the torque may be cheaper, lighter, and/or easier to maintain than a rotor assembly 10 with bolts 18 bearing all the torque. For example, the bushings 52 may have a total shear strength between approximately 1400 to 2000 MPa, 1500 to 1900 MPa, 1600 to 1800 MPa, or 1700 to 1750 MPa. The bolts 18 may have a total shear strength between approximately 250 to 1200 MPa, 400 to 1000 MPa, 500 to 750 MPa, or 600 to 700 MPa. In certain embodiments, the first set of bushings 52 may have a first total shear strength that is greater than a second total shear strength of the set of bolts 18.

Figure 4:
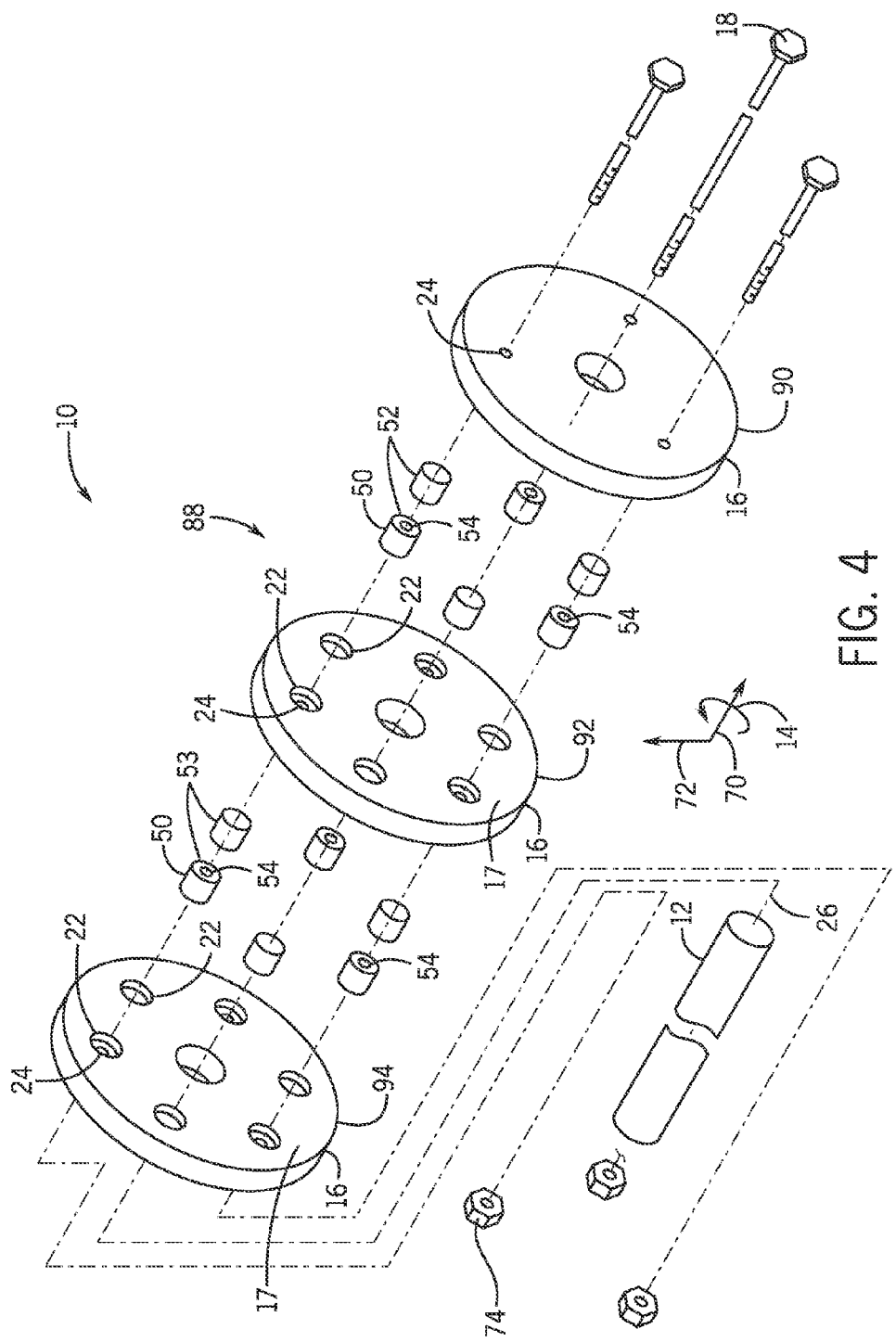
FIG. 4 is an exploded view of an embodiment of a rotor assembly.

FIG. 4 illustrates an exploded view of a rotor assembly 10 of a turbomachine 88 having a shaft 12, rotor components 16, bolts 18, and bushings 50 of the torque transfer bushing assembly 11 as described above. The shaft 12 may rotate in a circumferential direction 14 with the rotor components 16. The shaft 12 may be integral with, fixedly coupled to, or removably coupled at least one rotor component 16 to transfer torque with the rotor component 16 and the entire rotor assembly 10. The turbomachine 88 may have rotor components 90, 92, and 94, such as turbine rotor components, compressor rotor components, electrical generator components, load components, or combinations thereof. In an embodiment, the turbomachine 88 may have a first turbine rotor 90, a second turbine rotor 92, and a compressor rotor 94. As shown in FIG. 4, the shaft 12 may be coupled to the first turbine rotor 90, extend through and support the second turbine rotor 92, and also extend through other rotor components 16 (e.g., compressor rotor 94, load coupling). In an embodiment, the rotor assembly 10 of the turbomachine 88 may have two or more turbine rotors 90 in a turbine rotor assembly, two or more compressor rotors 94 in a compressor rotor assembly, or two or more load couplings in a load coupling rotor assembly, or combinations thereof. The turbomachine 88 may also include two or more rotor assemblies 10, each having a torque transfer bushing assembly 11.

As shown in FIG. 4, the first and second turbine rotors 90, 92 have opposing bushing receptacles 22 of slightly smaller diameters than the first set of bushings 52. The second turbine rotor 92 has an additional set of bushing receptacles 22 on the frictional interface 17 opposite the first turbine rotor 90 that corresponds to bushing receptacles 22 on the compressor rotor 94. A second set of bushings 53 may also have slightly larger diameters than the corresponding bushing receptacles 22 of the second turbine rotor 92 and the compressor rotor 94. A set of bolts 18 may extend through bolt holes 24, 54 of the rotor components 90, 92, 94 and both sets of bushings 52, 53 to fasten with a set of nuts 74 to axially compress and retain the rotor components 90, 92, 94 and bushings 52, 53 in an installed configuration. In the installed configuration, the first set of bushings 52 is interference fit into opposing bushing receptacles 22 to couple the first and second turbine rotors 90, 92, and the second set of bushings 53 is interference fit into corresponding bushing receptacles 22 to couple the second turbine rotor 92 and the compressor rotor 94. The bushings 52, 53 may also concentrically align the rotor components 90, 92, 94 about a common rotational axis 26 in series and transfer torque between the rotor components 90, 92, 94.

Figure 5:
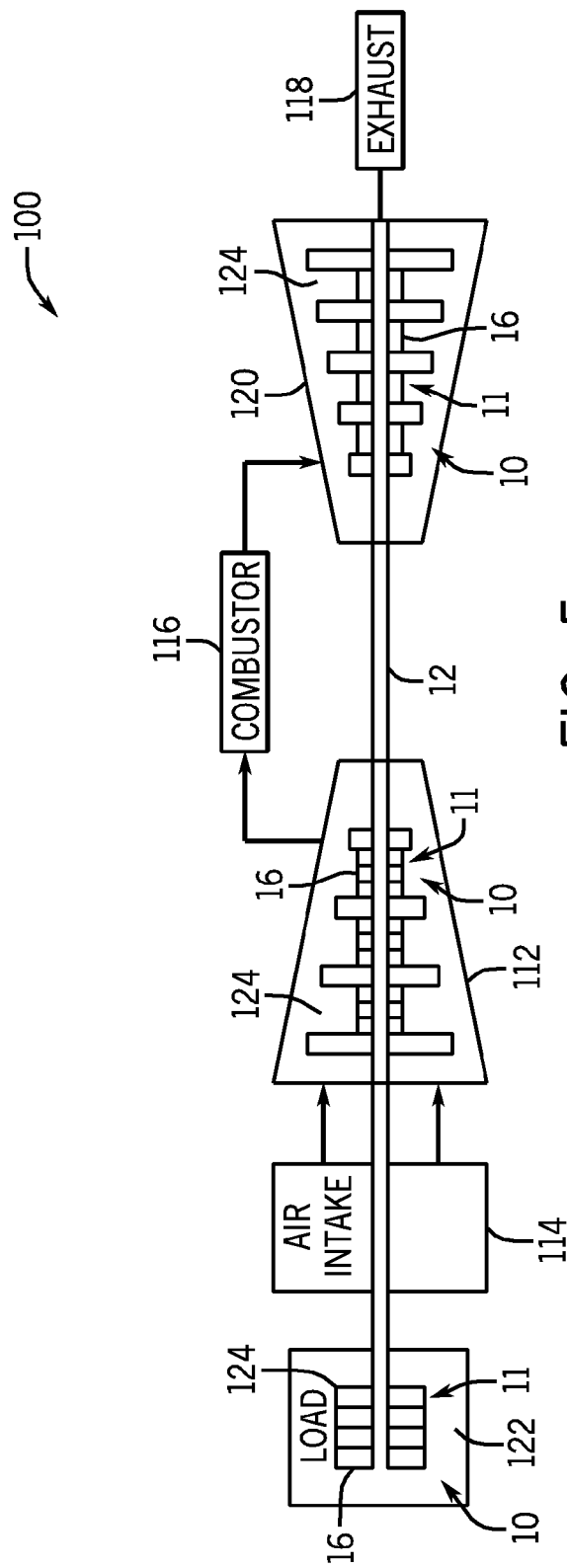
FIG. 5 is a block diagram of a turbine system including an embodiment of a compressor, turbine, and load.

The rotor assembly 10 described above may be utilized in any system with rotating parts. For example, a turbomachine such as a generator or a gas turbine engine may have at least one stator 124 and one or more rotor assemblies 10 with the torque transfer bushing assembly 11. As illustrated in FIG. 5, a gas turbine system 100 with the rotor assembly 10 as described above may have a compressor 112 that compresses and directs air from an air intake 114 into a combustor 116. The compressor 112 has rotating compressor blades to compress the air. In the combustor, the compressed air may combust with fuel to generate hot exhaust gases 118 that are directed through a turbine 120. The exhaust gases 118 cause the turbine blades of the turbine 120 to rotate. Both the compressor 114 and turbine 120 may have a rotor assembly 10 to transfer torque between the respective rotating rotor components 16 (e.g., turbine or compressor rotors). In some embodiments, the gas turbine system 100 has a common shaft 12 that couples the rotor assembly 10 of the turbine 120 with the rotor assembly 10 of another component of the gas turbine system 100, such as the compressor 114 or load 122 (e.g., electrical generator). In an embodiment, the compressor 114, turbine 120, and/or load 122 may have a common rotor assembly 10. The stator 124 may not be coupled to the shaft 12, and may include a plurality of non-rotating compressor blades, a plurality of non-rotating turbine blades, a non-rotating armature, or other non-rotating components, or combinations thereof.

Rotor assemblies 10 as described above may have at least two rotor components 16, a set of bushings 50, a set of opposing bushing receptacles 22, a set of bolt holes 24, and a set of bolts 18. In some embodiments, a rotor assembly 10 may have between 2 to 25, 3 to 20, 4 to 15, or 5 to 10 rotor components 16 concentrically aligned and coupled by respective sets of bushings 50 in opposing bushing receptacles 22. One or more sets of bolts 18 may axially compress, retain, and support all or subsets of rotor components 16. For example, a rotor assembly 10 with twelve rotor components 16 may have a first set of bolts 18 extending through all twelve rotor components 16, a second set of bolts 18 extending through the first four rotor components 16, a third set of bolts extending through the first six rotor components 16, and a fourth set of bolts extending through the last four rotor components 16. Additionally, as discussed above, each set of bolts 18 may extend through one or more sets of bushings 50.

Technical effects of the disclosed embodiments include aligning and transmitting torque between at least two rotor components 16 with bushings 50. The bushings 50 may be disposed in opposing bushing receptacles 22 that are arranged about the rotational axes 26 of respective rotor components 16. The bushing diameter 56 may be slightly larger than the bushing receptacle 22 diameter 62, thus the bushings 50 may be interference fit to align and constrain radial and circumferential movement of the rotor components 16. Bolts 18 may extend through the rotor components 16 and/or the bushings 50 to axially compress, retain, and support the rotor components 16 and the bushings 50. The bushings 50 may bear a substantially greater portion (or all) of the torque transferred between rotor components 16 than the bolts 18. Because the bolts 18 may bear a small portion, if any, of the torque, the bolts 18 may be sized smaller than if the bolts 18 bore a larger portion of the torque. Additionally, utilizing bushings 50 to align rotor components 16 may permit bolt holes 24 to be made through rotor components 16 that are not coaxial with each other.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
 a rotor assembly, comprising:
  a first rotor component having a first set of bushing receptacles and a first set of bolt holes arranged about a first rotational axis of the first rotor component, wherein each bolt hole of the first set of bolt holes has a first bolt hole diameter;
  a second rotor component having a second set of bushing receptacles and a second set of bolt holes arranged about a second rotational axis of the second rotor component, wherein each bolt hole of the second set of bolt holes has a second bolt hole diameter;
  a first set of bushings comprising a third set of bolt holes, wherein each bolt hole of the third set of bolt holes has a third bolt hole diameter, wherein the first set of bushings are disposed in the first and second sets of bushing receptacles in an installed configuration, wherein the installed configuration of the first set of bushings is configured to align the first and second rotational axes with one another; and a set of bolts extending through the first second, and third sets of bolt holes to retain the first rotor component, the second rotor component, and the first set of bushings in the rotor assembly, wherein the set of bolts has a bolt diameter that is less than the first bolt hole diameter, the second bolt hole diameter, and the third bolt hole diameter such that in the installed configuration, there is a first clearance between the set of bolts and the first set of bolt holes, a second clearance between the set of bolts and the second set of bolt holes, and a third clearance between the set of bolts and the third set of bolt holes.

2. The system of claim 1, wherein the first set of bushings has a first total shear strength sufficient to bear normal operating loads and minor over-torque loads.

3. The system of claim 1, wherein each bushing in the first set of bushings has a shear strength of greater than or equal to approximately 1400 MPa.

4. The system of claim 1, wherein the first set of bushings and a friction interface between the first rotor component and the second rotor component bears all of the torque during rotation of the rotor assembly.

5. The system of claim 1, comprising a second set of bushings, wherein each bushing of the second set of bushings comprises a solid body without any bolt hole.

6. The system of claim 1, wherein the first set of bushings is interference fit in the first and second sets of bushing receptacles in the installed configuration.

7. The system of claim 1, wherein the rotor assembly comprises:

a third set of bushing receptacles within the second rotor component;

a third rotor component having a fourth set of bushing receptacles and a fourth set of bolt holes arranged about a third rotational axis of the third rotor component, wherein each bolt hole of the fourth set of bolt holes has a fourth bolt hole diameter that is greater than the bolt diameter, such that there is a third clearance between the set of bolts and the third set of bolt holes;

a third set of bushings disposed in the third and fourth sets of bushing receptacles in the installed configuration, wherein the installed configuration of the third set of bushings is configured to align the second and third rotational axes with one another; and wherein the set of bolts extends through the first, second, and fourth sets of bolt holes to retain the first rotor component, the second rotor component, the third rotor component, the first set of bushings, and the third set of bushings in the rotor assembly.

8. The system of claim 1, comprising a turbine or a compressor having the rotor assembly.

9. The system of claim 1, comprising a generator having the rotor assembly.

10. The system of claim 1, wherein the set of bolts comprises one or more bolts, each bolt comprising a head, a threaded portion, and a fastener, wherein only the head and the fastener contact the first and second rotor components in the installed configuration.

11. A system, comprising:
a turbomachine, comprising:
a stator; and
a rotor assembly configured to rotate relative to the stator, comprising:
a first rotor component having a first set of bushing receptacles and a first set of bolt holes arranged about a first rotational axis of the first rotor component, wherein each bolt hole of the first set of bolt holes has a first bolt hole diameter;
a second rotor component having a second set of bushing receptacles and a second set of bolt holes arranged about a second rotational axis of the second rotor component, wherein each bolt hole of the second set of bolt holes has a second bolt hole diameter;
a first set of bushings disposed in the first and second sets of bushing receptacles in an installed configuration, wherein the installed configuration of the first set of bushings is configured to align the first and second rotational axes with one another, the first set of bushings comprising a third set of bolt holes wherein each bolt hole of the third set of bolt holes has a third bolt hole diameter; and
a set of bolts extending through the first, second, and third sets of bolt holes to retain the first rotor component, the second rotor component, and the one or more of the first set of bushings in the rotor assembly, wherein the set of bolts has a bolt diameter that is less than the first bolt hole diameter, the second bolt hole diameter, and the third bolt hole diameter such that the set of bolts has a clearance through the first, second, and third sets of bolt holes.

12. The system of claim 11, wherein the first set of bushings and a friction interface between the first rotor component and the second rotor components bears all of the torque during rotation of the rotor assembly.

13. The system of claim 11, wherein the turbomachine comprises a turbine, a compressor, or a combination thereof.

14. The system of claim 11, wherein the first set of bushings is interference fit in the first and second sets of bushing receptacles in the installed configuration.

15. The system of claim 11, wherein the set of bolts comprises one or more bolts, each bolt comprising a head, a threaded portion, and a fastener, wherein only the head and the fastener are in contact with the first and second rotor components in the installed configuration.

16. A method, comprising:
aligning a first rotational axis of a first rotor component with a second rotational axis of a second rotor component with a first set of bushings disposed in first opposing bushing receptacles in the first and second rotor components, wherein the first set of bushings and the first opposing bushing receptacles are arranged about the first and second rotational axes;
bearing, in the first set of bushings and a first frictional interface between the first rotor component and the second rotor component, more than 90% of a torque during rotation of a rotor assembly having the first rotor component and the second rotor components; and
retaining the rotor assembly axially with one or more bolts extending through bolt holes in the first rotor component the second rotor component, and the first set of bushings, wherein a diameter of the bolts is less than a diameter of the bolt holes such that in an installed configuration, there is a clearance between the one or more bolts and the bolt holes.

17. The method of claim 16, comprising:
aligning a third rotational axis of a third rotor component with the second rotational axis of the second rotor component with a second set of bushings disposed in second opposing bushing receptacles in the second and third rotor components, wherein the second set of bushings and the second opposing bushing receptacles are arranged about the first, second, and third rotational axes; and
bearing, in the second set of bushings and a second frictional interface between the second rotor component and the third rotor component, all of the torque during rotation of the rotor assembly having the first rotor component, the second rotor component, and the third rotor component.

18. The method of claim 16, comprising compressing the first rotor component and the second rotor component by attaching one or more fasteners to the one or more bolts.

19. The method of claim 16, comprising sorting a plurality of rotor components with a master tool to select the first rotor component and the second rotor component from the plurality of rotor components.

\* \* \* \* \*